E. D. CLEGHORN.
SCREWING DIE AND TAP SPINDLE.
APPLICATION FILED JAN. 29, 1906.

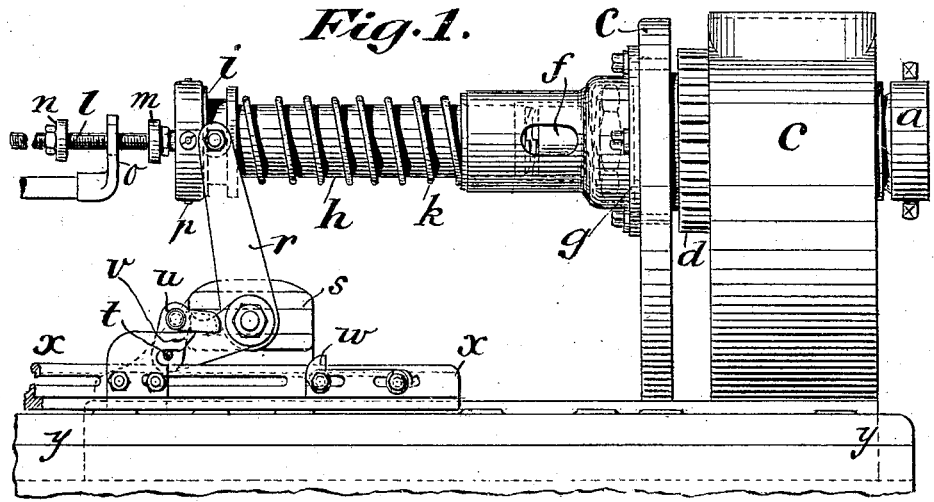

907,741.

Patented Dec. 29, 1908.
3 SHEETS—SHEET 2.

Witnesses
Alfred Bosshardt.
Stanley R. Bramall

Inventor.
Edward Duncan Cleghorn
Per J. Bosshardt,
Attorney.

Figure 4:
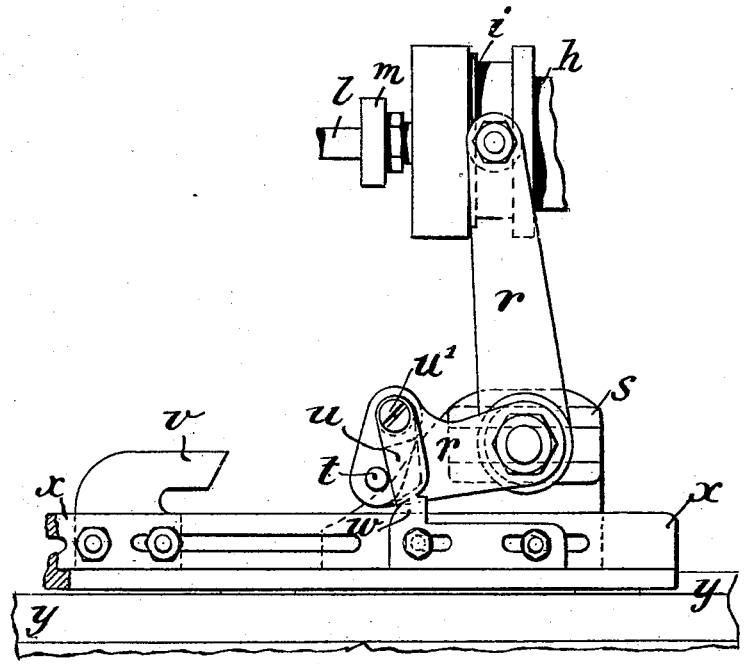

E. D. CLEGHORN.
SCREWING DIE AND TAP SPINDLE.
APPLICATION FILED JAN. 29, 1906.
907,741.
Patented Dec. 29, 1908.
3 SHEETS—SHEET 3.
Fig. 4ˣ.
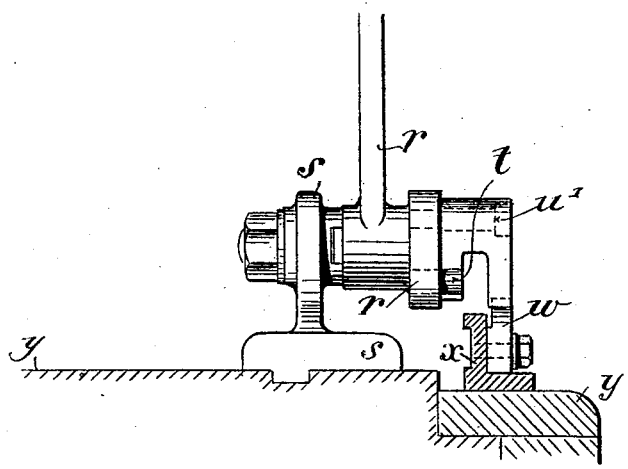

UNITED STATES PATENT OFFICE.

EDWARD DUNCAN CLEGHORN, OF OLD TRAFFORD, ENGLAND, ASSIGNOR, BY DIRECT AND MESNE ASSIGNMENTS, TO BOSTON BOLT COMPANY, OF BOSTON, MASSACHUSETTS, A CORPORATION OF MASSACHUSETTS.

SCREWING-DIE AND TAP-SPINDLE.

No. 907,741.         Specification of Letters Patent.       Patented Dec. 29, 1908.

Application filed January 29, 1906. Serial No. 293,511.

*To all whom it may concern:*

Be it known that I, EDWARD DUNCAN CLEGHORN, subject of Great Britain, residing at Old Trafford, in the county of Lancaster, England, have invented new and useful Improvements in and Connected with Screwing-Dies and Tap-Spindles, of which the following is a specification.

My invention relates to improvements in and connected with screwing dies and tap spindles and the object is to provide a spindle whereby more and better work can be produced than hitherto has been the case and thus the efficiency of such tools increased.

This improved spindle is adapted to carry a screwing die or tap, screw same over or into the piece of work which may be carried by a spindle or other suitable device rotated in the same direction as the screwing die or tap spindle but at a less speed, say to cut a thread at a rate of 30 threads per inch per minute, the die or tap would require to run 30 revolutions per minute faster than the work.

By means of a suitable clutch device this die and tap spindle is also adapted to stop automatically when the work has been screwed to the desired length while the work still revolving then backs off the die or tap and runs them clear of itself, the die or tap spindle with-drawing then also automatically. The die or tap is thus caused to screw on or into the work only by its increased speed and the tendency of the work rotation is to screw it off.

I attain these objects by the mechanism illustrated in the accompanying three sheets of drawings, in which—

Figure 5:
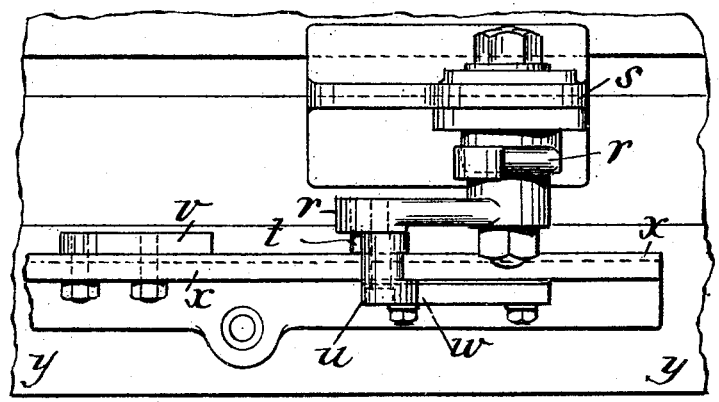

Figure 1 is an elevation, Fig. 2 a longitudinal section and Fig. 3 a sectional end view of my improved screwing die and tap spindle device. Fig. 4 is a side view and Fig. 5 a plan of the back portion of the spindle at a slightly enlarged scale. Fig. $4^\times$ is a sectional end view of the lower portion of Fig. 4.

Similar letters refer to similar parts throughout the several views.

In carrying out my invention and referring to the figures generally, according to one embodiment I mount the screwing die or tap spindle $a$ longitudinally movable in a sleeve $b$ adapted to rotate in a sliding body $c$ advancing in the same direction as this spindle.

To the sleeve $b$ is keyed a wheel $d$ and internally a clutch sleeve $e$ gartered to the spindle $a$ and to the latter is slidably keyed a double clutch $f$ adapted to engage the clutch sleeve $e$, whereby rotary motion is imparted to the die or tap spindle $a$.

In a bracket $g$ fixed to the sliding body $c$ is mounted adjacent to the said double clutch non-rotary and longitudinally movable, a clutch sleeve $h$ through which the rear part of the spindle $a$ extends.

The rear end of the die or tap spindle $a$ has secured to it a grooved collar $i$ and between it and the bracket $g$ a coiled spring $k$ is employed around the clutch sleeve $h$.

In the rear part of the spindle $a$ is employed a trip rod $l$ the front end of which is pinned to the slidable double clutch $f$ and the rear end screw-threaded and furnished with two nuts $m$, $n$ adapted to contact with a fixed abutment $o$ employed between them. Behind the inner nut $m$ is screwed on the rod $l$ a cone $z$ adapted to bear against and operate in conjunction with the coned ends of trip bolts $p$ located under the influence of springs $q$ in the grooved collar $i$.

In the grooved collar $i$ engages a bell crank lever $r$ fulcrumed to a bracket $s$ fixed to the base of the tool slide or body $c$. The other arm of this lever carries a stud $t$ and also a double arm swinging link $u$ pivoted thereto by the stud $u'$. To the bed $y$ of the machine is fixed the angle iron $x$ having secured at a suitable distance apart from each other at the back, the hooked cam projections $v$ and in front the cam dog $w$. The stud $t$ is adapted to operate in conjunction with the hooked cam projection $v$ and acts also as a stop for the back arm of the link $u$ when hanging down to bear against while the front arm operates in conjunction with the cam dog $w$.

The operation of the screwing die and tap spindle is as follows:—When starting the operation, the lever $r$ and the link $u$ are in the position shown in Fig. 1, the link $u$ resting upon and the stud $t$ being underneath the hooked cam projection $v$, the double clutch $f$ is in engagement with the clutch or cam sleeve $e$ keyed to the die or tap spindle sleeve $b$ and splined to the die or tap spindle $a$ and the latter thereby rotated. As the body or tool slide $c$ advances the double arm link $u$ leaves the hooked cam projection $v$ and dropping against the stud $t$ is timed to contact with the cam dog $w$ see Figs. 4 and 5 and through the medium of the bell crank lever $r$ kick the die or tap spindle $a$ to the end of the work in advance of the movement of the body or tool slide $c$ and thereby start the work by imparting to the spindle $a$ a slight push while making the first thread. When the die or tap spindle $a$ has advanced to its required length of screwing, the slidable double clutch $f$ is withdrawn from the clutch sleeve $e$ and brought in engagement with the non-rotatable clutch sleeve $h$ by the nut $n$ contacting with the respective abutment $o$ and being shot back by means of the coiled spring $k$ which brings the cone $z$ behind the coned trip bolts $p$. The die or tap spindle $a$ then cannot rotate but as it is free to slide backwards, the work is free to run itself out of or off the die or tap respectively, after which the coiled spring $k$ will return the die or tap spindle $a$ to its normal position. The said double clutch sleeve $f$ is brought in engagement again with the clutch sleeve $e$ by the cone $z$ on the trip rod $l$ connected with the abutment $o$ on the return movement of the slide $c$, the last one quarter inch of the return being used for this purpose. When the cone $z$ contacts with the said abutment the aforesaid hooked cam projection $v$ engages the stud on the bell crank lever $r$ and through the latter holds the die or tap spindle $a$ in its back position while the cone $z$ is tripped to the other side of the said trip bolts $p$.

What I claim as my invention and desire to secure by Letters Patent, is—

1. In a screwing and tapping device, a slidable body, a tool spindle slidable therein and having a sleeve around it, a driven gear secured to the said sleeve, a double ended clutch slidably secured to the said spindle, a single ended non-rotary clutch connected to the body and around the spindle and a single ended clutch gartered to the said spindle and connected for rotation to the said sleeve at the inner end of the said double ended clutch, and means for throwing the latter in and out of gear with the said single ended clutches, all combined substantially as and for the purpose set forth.

2. In a screwing and tapping device, a slidable body, a tool spindle adapted to slide therein, a lever fulcrumed to the said body one end of which engages the rear end of the said spindle, means for locking the said lever and thereby the said spindle in its back position, comprising a stationary cam projection, a stud on the other end of the said lever adapted to engage under the said projection, a stationary cam dog in the path of and a link pivoted to the latter lever and adapted to contact with the said stationary dog on the forward movement of the said body, all combined substantially as and for the purpose set forth.

3. In a screwing and tapping device, a slidable body, a tool spindle slidable therein and having a sleeve around it, a driven gear secured to the said sleeve, a double ended clutch slidably secured to the said spindle, a single ended non-rotary clutch connected to the body and around the spindle and a single ended clutch gartered to the said spindle and connected for rotation to the said sleeve at the inner end of the said double ended clutch, a rod slidable in the spindle to which the said double ended clutch is secured and means for imparting an intermittent reciprocatory longitudinal movement to the said rod and thereby bring the said double ended clutch alternately in and out of gear with the said non-rotary clutch, all combined substantially as and for the purpose set forth.

4. In a screwing and tapping device, a slidable body, a tool spindle slidable therein and having a sleeve around it, a driven gear secured to the said sleeve, a double ended clutch slidably secured to the said spindle, a single ended non-rotary clutch connected to the body and around the spindle and a single ended clutch gartered to the said spindle and connected for rotation to the said sleeve at the inner end of the said double ended clutch, a rod slidable in the said spindle the forward end of which is connected with the said double ended clutch and the rear end extending through the said spindle, a trip cone and two adjustable nuts on the latter, a fixed abutment with which the said nuts contact alternately and trip bolts in the rear end of the said spindle to operate in conjunction with the said trip cone, all combined substantially as and for the purpose set forth.

In testimony whereof I have signed my name to this specification in the presence of two subscribing witnesses.

EDWARD DUNCAN CLEGHORN.

Witnesses:
ALFRED BOSSHARDT,
STANLEY E. BRAMALL.